United States Patent
Kim

(10) Patent No.: US 11,530,729 B2
(45) Date of Patent: Dec. 20, 2022

(54) DAMPING FORCE CONTROLLING SHOCK ABSORBER

(71) Applicant: MANDO CORPORATION, Gyeonggi-do (KR)

(72) Inventor: Namho Kim, Gyeonggi-do (KR)

(73) Assignee: HL MANDO CORPORATION, Gyeonggi-Do (KR)

( * ) Notice: Subject to any disclaimer, the term of this patent is extended or adjusted under 35 U.S.C. 154(b) by 134 days.

(21) Appl. No.: 16/533,047

(22) Filed: Aug. 6, 2019

(65) Prior Publication Data

US 2020/0049220 A1 Feb. 13, 2020

(30) Foreign Application Priority Data

Aug. 9, 2018 (KR) .......................... 10-2018-0093297

(51) Int. Cl.
- *F16F 9/34* (2006.01)
- *F16F 9/18* (2006.01)
- *F16F 9/512* (2006.01)
- *F16F 9/32* (2006.01)
- *F16F 9/46* (2006.01)

(52) U.S. Cl.
CPC ............ *F16F 9/185* (2013.01); *F16F 9/3257* (2013.01); *F16F 9/5126* (2013.01); *F16F 9/461* (2013.01); *F16F 2230/18* (2013.01)

(58) Field of Classification Search
CPC .. F16F 9/461; F16F 9/466; F16F 9/468; F16F 9/469

See application file for complete search history.

(56) References Cited

U.S. PATENT DOCUMENTS

| | | | | |
|---|---|---|---|---|
| 4,671,392 A | * | 6/1987 | Wossner | F16F 9/468 188/266.3 |
| 5,096,025 A | * | 3/1992 | Herberg | F16F 9/46 188/266.5 |

(Continued)

FOREIGN PATENT DOCUMENTS

| | | |
|---|---|---|
| CN | 106015432 | 10/2016 |
| CN | 106151353 | 11/2016 |

(Continued)

OTHER PUBLICATIONS

Office Action dated May 27, 2022 for Chinese Patent Application No. 201910732943.6 and its English translation from Global Dossier.

*Primary Examiner* — Bradley T King
(74) *Attorney, Agent, or Firm* — Ladas & Parry, LLP

(57) ABSTRACT

A damping force variable shock absorber of the present disclosure is disclosed. The damping force variable shock absorber includes a cylinder having an inner tube and an outer tube filled with a fluid, a housing coupled to a lower end of a piston rod located inside of the inner tube and forming a connection passage therein, a magnet member provided inside the housing, a plunger moving by magnetic force of the magnet member, a first piston valve coupled to the outside of the housing to divide a compression chamber from a rebound chamber, and a second piston valve provided in the housing, wherein the connection passage is provided such that at least a part of the fluid flowing toward the first piston valve is bypassed to the second piston valve side by the opening and closing of the plunger.

9 Claims, 8 Drawing Sheets

(56) References Cited

U.S. PATENT DOCUMENTS

| | | | |
|---|---|---|---|
| 6,460,663 B1* | 10/2002 | Huang | F16F 9/3214 |
| | | | 188/266.5 |
| 2003/0106753 A1* | 6/2003 | Nezu | F16F 9/3405 |
| | | | 188/322.15 |
| 2012/0145496 A1* | 6/2012 | Goetz | F16F 9/464 |
| | | | 188/282.1 |
| 2014/0116825 A1* | 5/2014 | Lindeman | F16F 9/50 |
| | | | 188/266.2 |
| 2016/0167474 A1* | 6/2016 | Slusarczyk | F16F 9/064 |
| | | | 188/269 |
| 2016/0201753 A1* | 7/2016 | Nakano | F16F 9/512 |
| | | | 188/266.3 |
| 2017/0058987 A1* | 3/2017 | Nakano | F16F 9/19 |
| 2018/0038441 A1* | 2/2018 | Smeljanskij | F16F 9/3481 |

FOREIGN PATENT DOCUMENTS

| | | |
|---|---|---|
| DE | 4034876 C1 * | 11/1991 |
| JP | 8-223994 | 8/1996 |
| KR | 10-2008-0094538 | 10/2008 |
| KR | 10-2009-0003019 | 1/2009 |
| KR | 10-2017-0078595 | 7/2017 |

* cited by examiner

[FIG. 1]
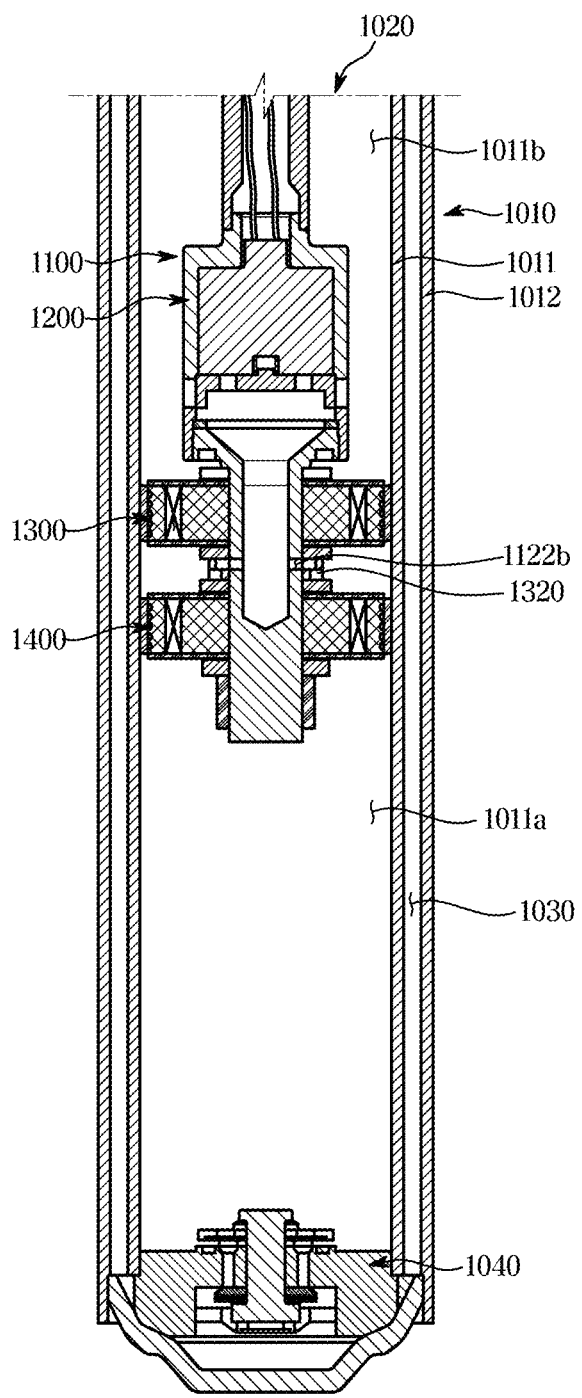

[FIG. 2]
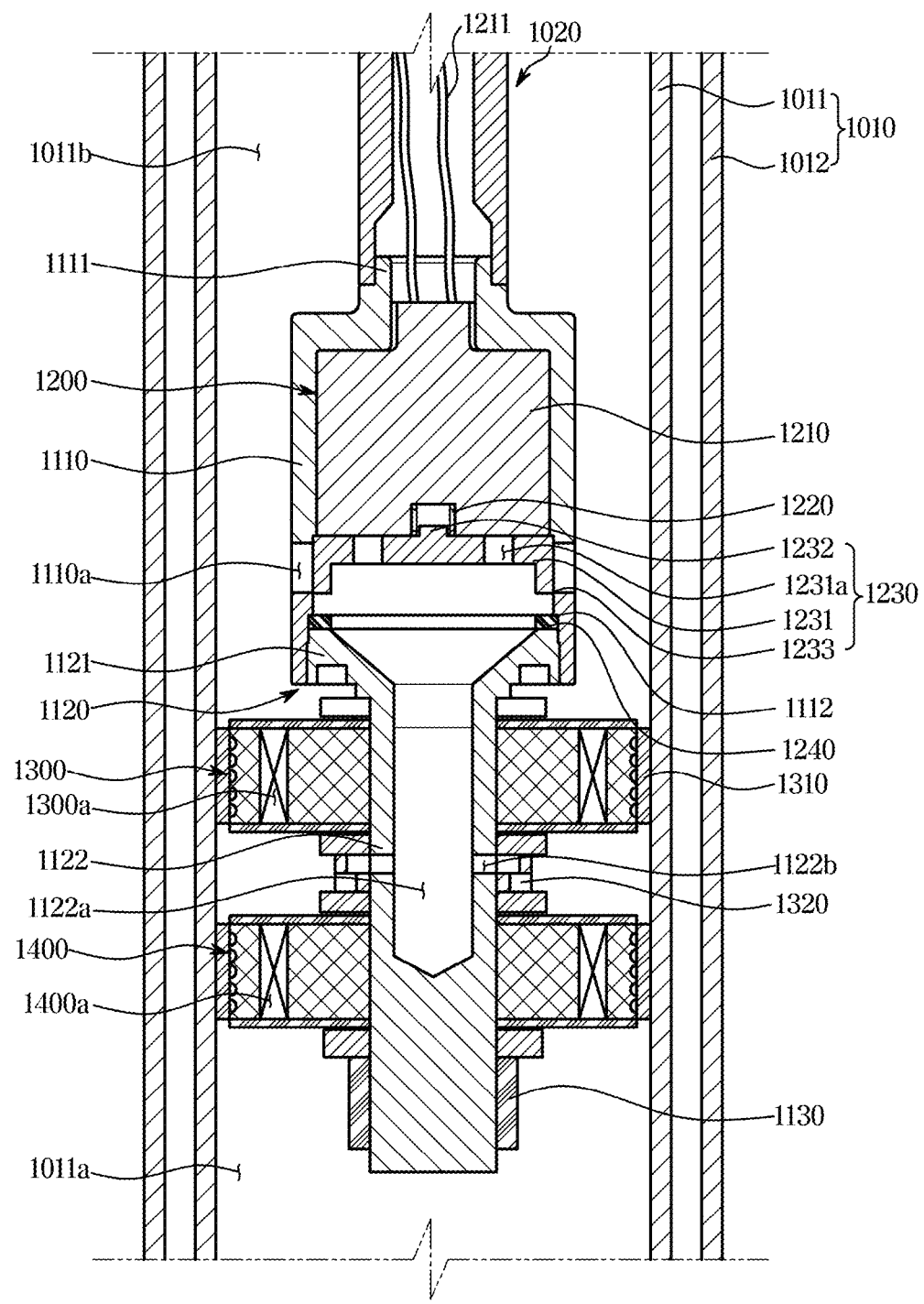

[FIG. 3]
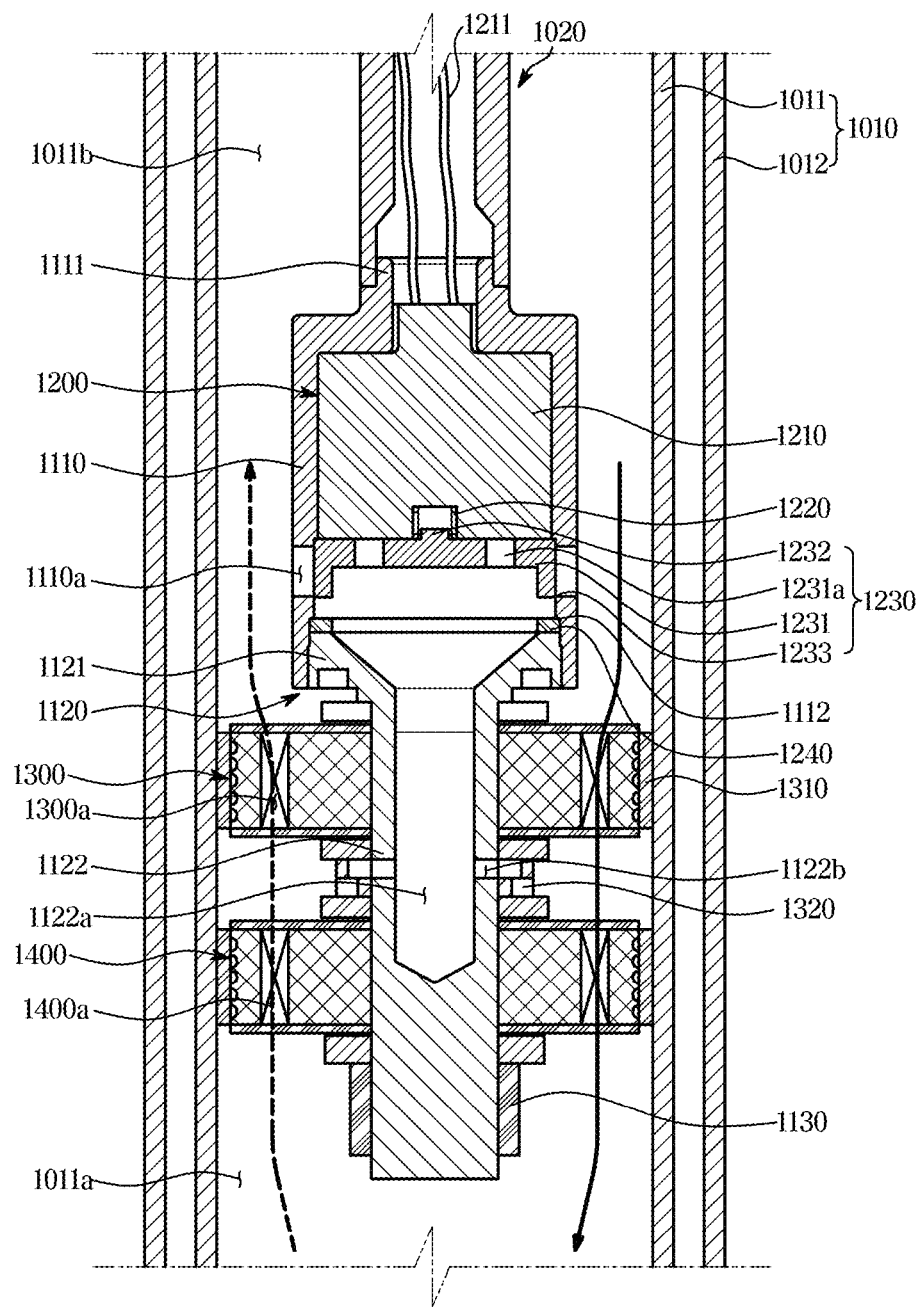

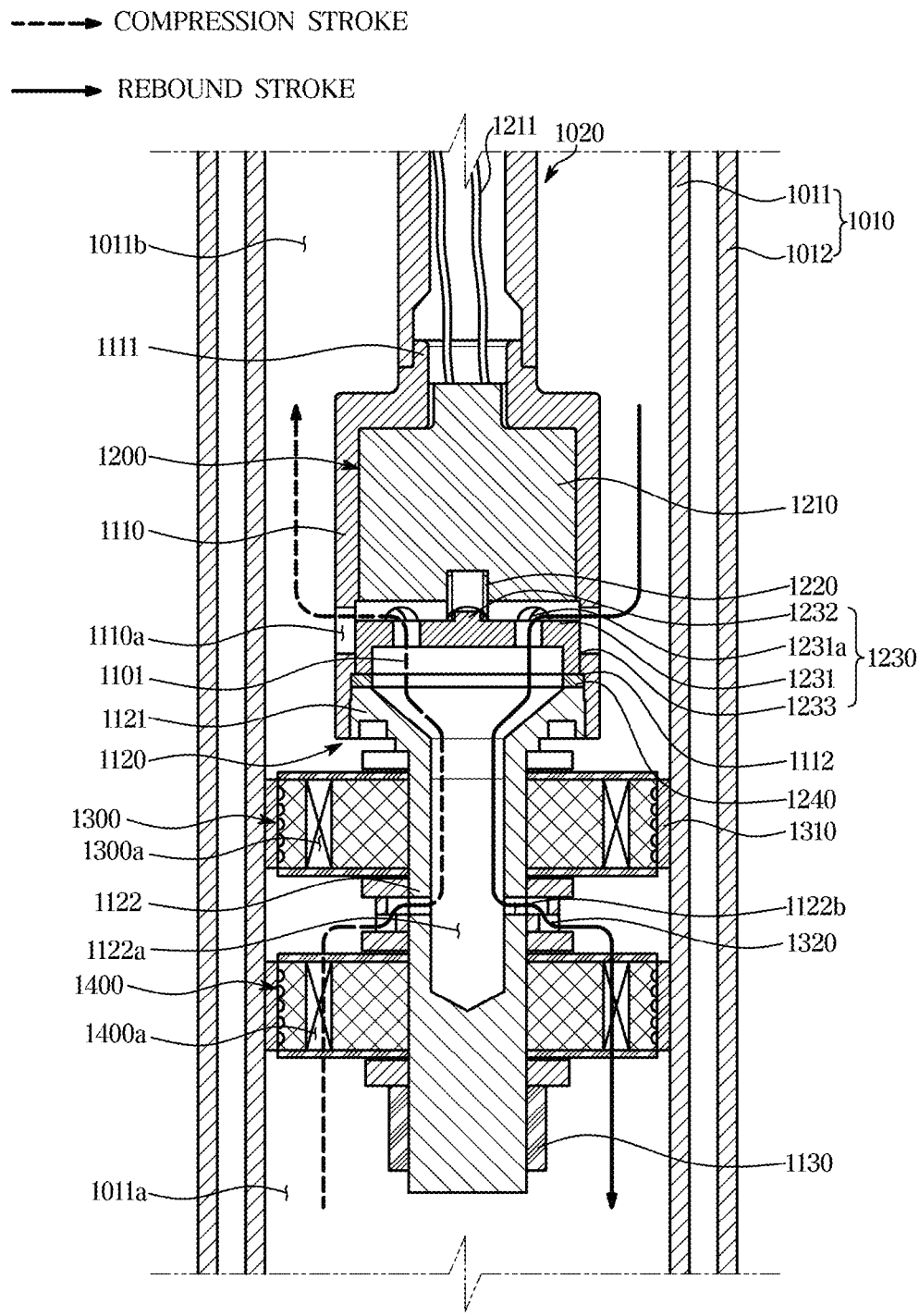
[FIG. 4]
- - - → COMPRESSION STROKE
——→ REBOUND STROKE

[FIG. 5]
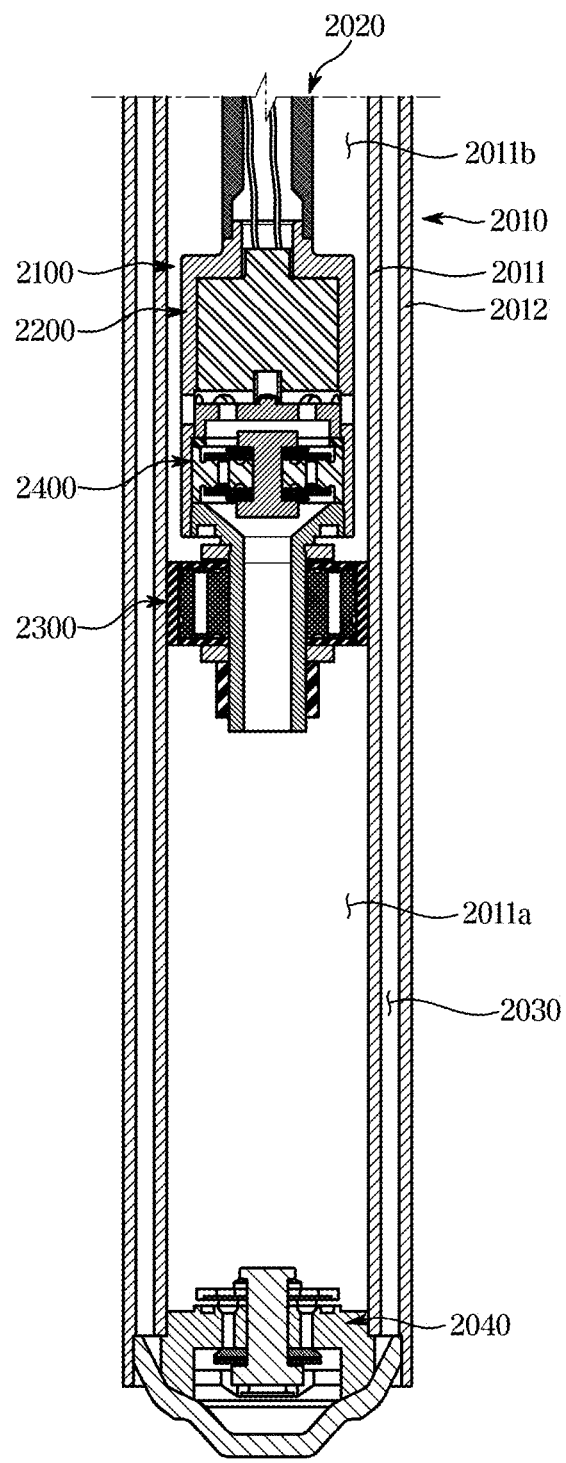

[FIG. 6]
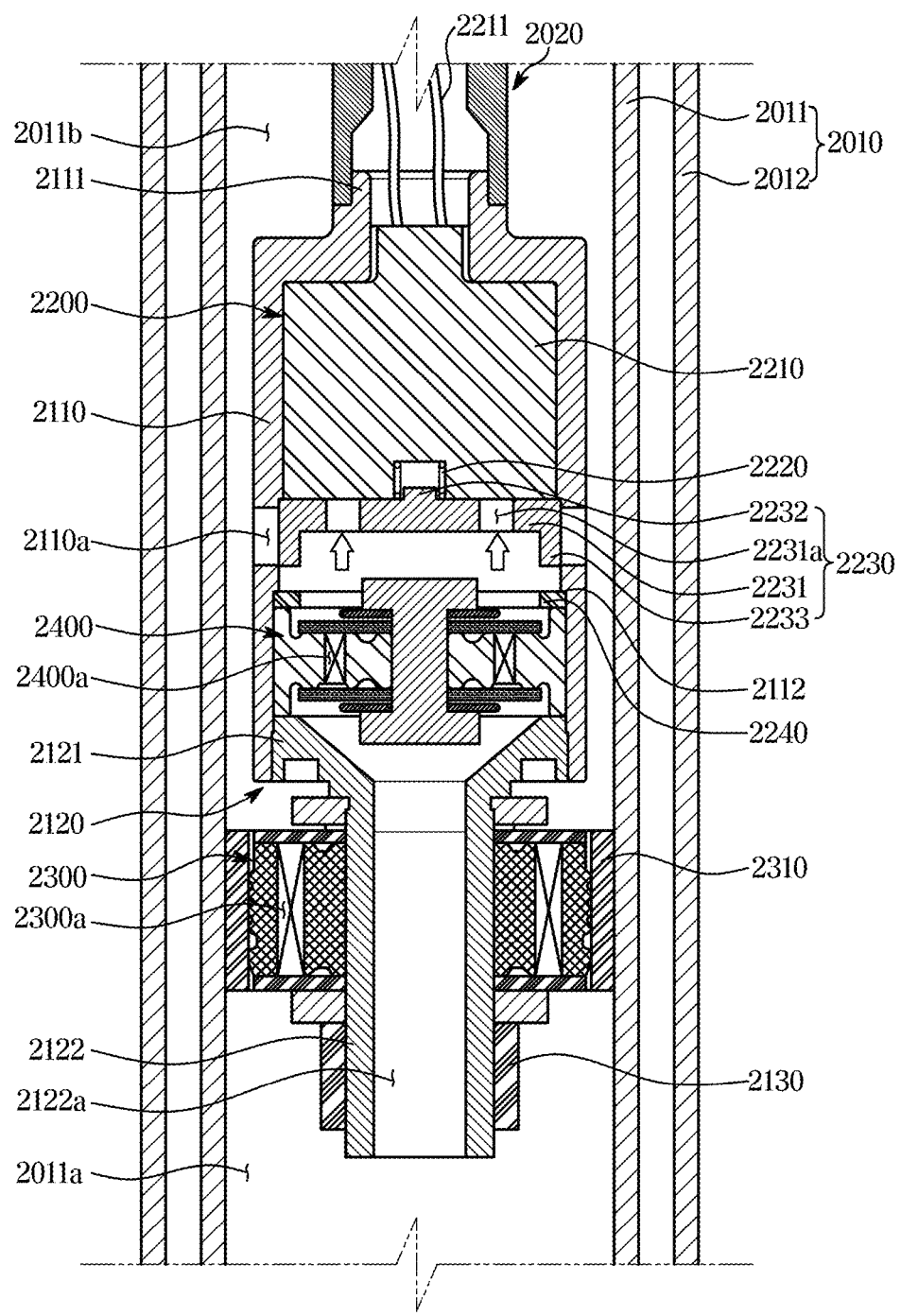

[FIG. 7]
- - - ▶ COMPRESSION STROKE
———▶ REBOUND STROKE
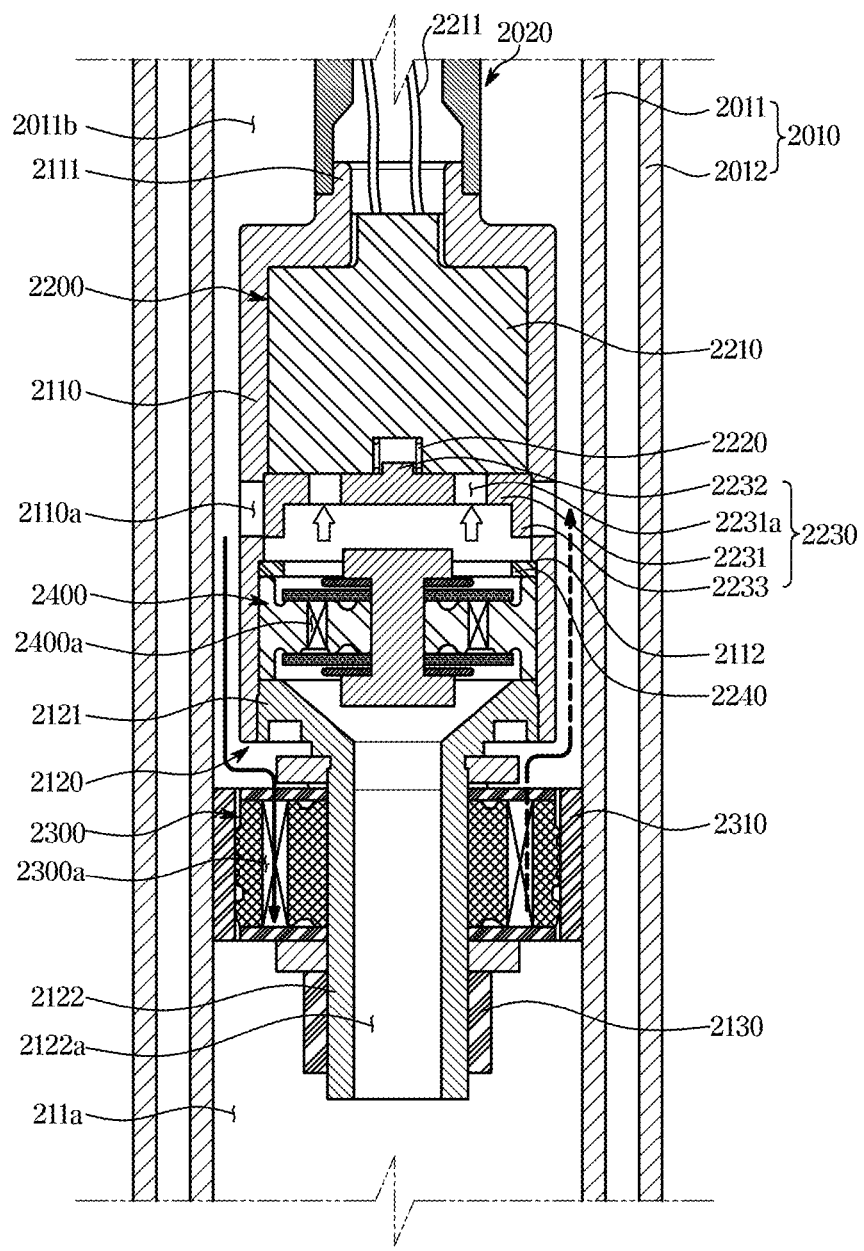

[FIG. 8]
---→ COMPRESSION STROKE
—→ REBOUND STROKE
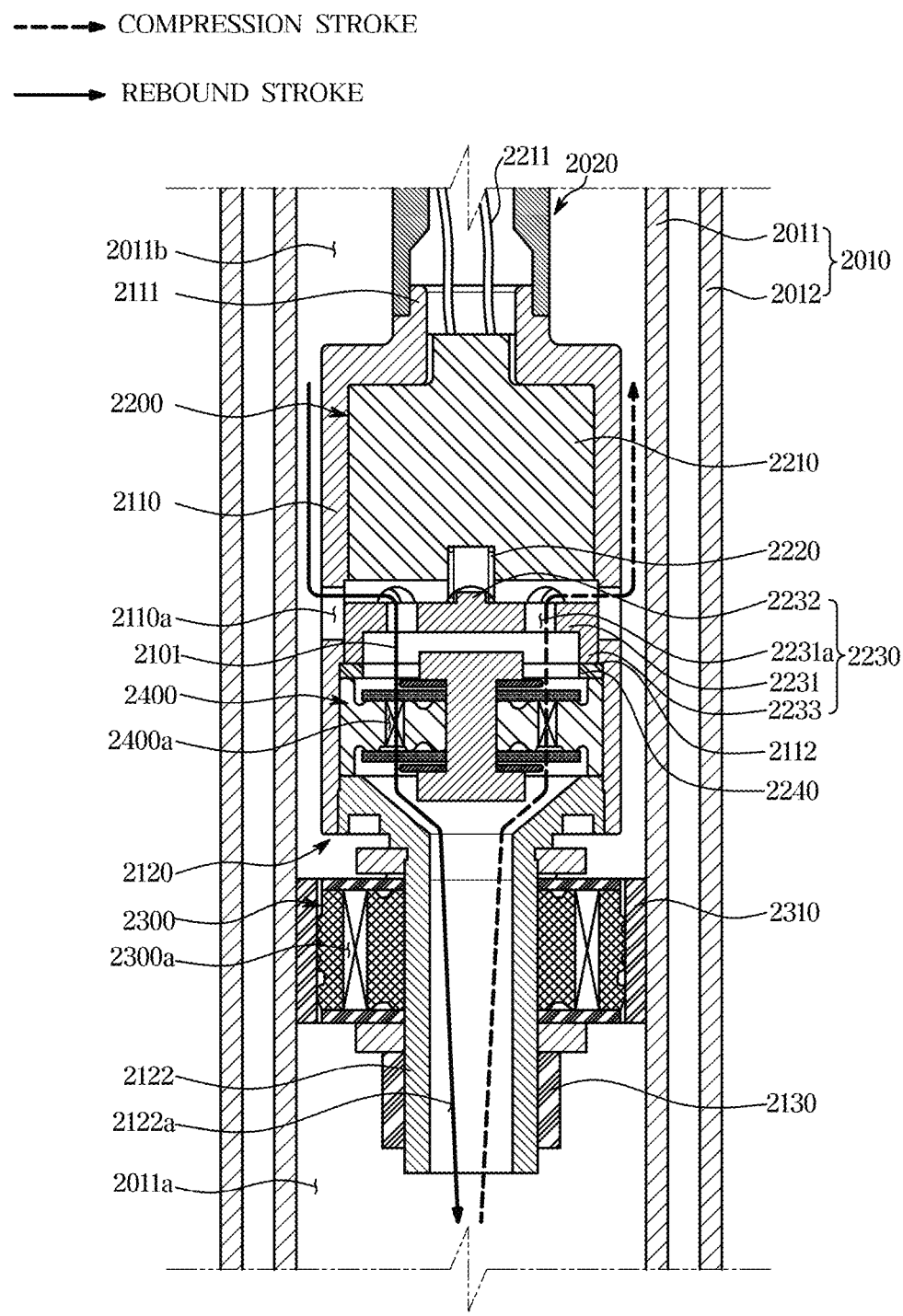

DAMPING FORCE CONTROLLING SHOCK ABSORBER

CROSS-REFERENCE TO RELATED APPLICATION(S)

This application is based on and claims priority under 35 U.S.C. § 119 to Korean Patent Application No. 10-2018-0093297, filed on Aug. 9, 2018, in the Korean Intellectual Property Office, the disclosure of which is incorporated herein by reference in its entirety.

BACKGROUND

1. Field

The present disclosure relates to a damping force variable shock absorber provided in a vehicle for mitigating impact transmitted from the ground.

2. Description of the Related Art

Generally, a shock absorber is installed in means of transportation such as an automobile or the like, and improves ride comfort by absorbing and damping a vibration and shock from a road surface during driving. Such a shock absorber includes a cylinder and a piston rod installed to be compressible and extendable within the cylinder and the cylinder and the piston rod are respectively connected to a vehicle body, wheels, or axles.

When a damping force is set to be low, a shock absorber can improve ride comfort by absorbing a vibration caused by unevenness of a road surface during driving. On the contrary, when a damping force is set to be high, a shock absorber can improve steering stability by suppressing a change in a posture of a vehicle body.

Therefore, a damping force variable shock absorber has been recently developed, which is equipped with a damping force variable valve at one side thereof so as to appropriately adjust damping force characteristics thereof for the purpose of improving ride comfort or steering stability according to a road surface, a driving condition, and the like.

Conventional damping force variable shock absorber has a structure that selectively opens and closes a plurality of flow path formed in a spool guide through variable spool positions resulting in selecting a hard flow path and a soft flow path. That is, by controlling open and closed states of the hard and soft flow path formed in the spool guide, a hard damping force or a soft damping force can selectively be generated.

In addition, conventional damping force variable shock absorber has separately formed a back pressure passage for forming a hard damping force and a soft passage for forming a soft damping force.

Such conventional damping force variable shock absorber includes a piston which divides a cylinder into a compression chamber and a rebound chamber, a back pressure chamber for forming a back pressure during compression and rebound strokes, a main retainer provided between the piston and the back pressure chamber and formed a connection passage, a disk for generating a damping force between the back pressure chamber and the main retainer, and a sub-retainer for regulating a flow path connected to the back pressure chamber.

Conventional damping force variable shock absorber can control real-time damping force by implementing various damping force performance curves while the flow path is changed depending on the movement of a spool according to the current input to a solenoid valve. However, conventional damping force variable shock absorber needs to various sensors such (Wheel G-sensor and Body G-sensor) for recognizing vehicle behavior, a complicated valve flow path, and an expensive system.

RELATED ART DOCUMENT

Patent Document

Korean Patent Laid-Open Publication No. 10-2009-0003019 (2009 Jan. 9)

SUMMARY

It is an aspect of the present disclosure to provide a damping force variable shock absorber capable of selectively using a soft or hard damping force as need such that range of use is wide.

Additional aspects of the disclosure will be set forth in part in the description which follows and, in part, will be obvious from the description, or may be learned by practice of the disclosure.

In accordance with one aspect of the present disclosure, a damping force variable shock absorber includes a cylinder having an inner tube and an outer tube filled with a fluid, a housing coupled to a lower end of a piston rod located inside of the inner tube and forming a connection passage therein, a magnet member provided inside the housing, a plunger moving by magnetic force of the magnet member, a first piston valve coupled to the outside of the housing to divide a compression chamber from a rebound chamber, and a second piston valve provided in the housing, wherein the connection passage is provided such that at least a part of the fluid flowing toward the first piston valve is bypassed to the second piston valve side by the opening and closing of the plunger.

Further, the connection passage may pass a first housing hole opened and closed by the plunger and a second housing hole provided between the first piston valve and the second piston valve, and when the plunger is moved to a hard mode the plunger closes the connection passage so that the fluid passes through the first and second piston valves, and when the plunger is moved in a soft mode the plunger opens the connection passage so that the fluid passes through the second piston valve through the connection passage.

Further, the housing may include an upper housing coupled to an inner surface of the piston rod at an upper portion thereof and a lower housing coupled to a lower portion of the upper housing, the lower housing provided with the first and second piston valves.

Further, the lower housing may include a fastening body coupled to the upper housing and a valve guide provided with a guide hole and extending to a lower portion of the fastening body and fastening the first and second piston valves with a nut, and the first and second piston valves may be restrained between the fastening body and the nut coupled to a lower side of the valve guide.

Further, the damping force variable shock absorber may further include an elastic member supported by the magnet member at one end and configured to press downward the plunger at the other end.

Further, the plunger may include a disk-shaped plunger body, a plunger hole formed in the plunger body, a protrusion formed on the upper of the plunger body and restricting the horizontal movement of the elastic member, and a blocking portion protruding downward from an edge of the plunger body and opening and closing the first housing hole of the housing by the vertical moving of the plunger body.

Further, the damping force variable shock absorber may further include a stop ring provided between the plunger and the housing for restricting the range of movement of the plunger by serving as a stopper.

Further, the plunger hole may be vertically penetrated to be positioned below the first housing hole when the plunger is lowered, and may be penetrated downward to connect to an upper end of the guide hole.

Further, the connection passage, when opened in the soft mode, may be provided to pass through the first housing hole, a plunger hole provided in the plunger, a guide hole provided in the lower housing, and the second housing hole.

Further, the second piston valve, in the state where the connection passage is opened, may move the fluid in the compression chamber through the connection passage to the rebound chamber during a compression stroke of the piston rod and moves the fluid in the rebound chamber through the connection passage to the compression chamber during a rebound stroke of the piston rod.

Further, the second piston valve may be fixedly provided inside the housing and is located below the magnet member, the plunger is installed between the magnet member and the second piston valve and moves by magnetic force of the magnet member to open and close the connection passage, and when the plunger is moved to a hard mode the plunger closes the connection passage so that the fluid passes through the first piston valve and when the plunger is moved in a soft mode the plunger opens the connection passage so that the fluid passes through the second piston valve.

Further, the housing may include an upper housing coupled to an inner surface of the piston rod at an upper portion thereof and a lower housing coupled to a lower portion of the upper housing, the lower housing provided with the first piston valves.

Further, the lower housing may include a disk-shaped fastening body coupled to the upper housing and a valve guide extending to a lower portion of the fastening body and coupled with the first piston valve, and the first piston valve is restrained by the fastening body and a nut coupled to a lower side of the valve guide.

Further, the damping force variable shock absorber may further include an elastic member supported by the magnet member at one end and configured to press the plunger to the second piston valve side at the other end.

Further, the plunger may include a disk-shaped plunger body, a plunger hole formed in the plunger body, a protrusion formed on the upper of the plunger body and restricting the horizontal movement of the elastic member, and a blocking portion protruding downward from an edge of the plunger body and opening and closing a housing hole of the housing by the vertical moving of the plunger body.

Further, the plunger hole may be vertically penetrated to be positioned below the housing hole when the plunger is lowered, and is penetrated downward to connect to an upper end of the guide hole.

Further, the connection passage, when opened in the soft mode, may be provided to pass through the housing hole provided in the housing, a plunger hole provided in the plunger, a second valve passage provided in the second piston valve, and a guide hole provided in the housing.

Further, the second piston valve, in the state where the connection passage is opened, may move the fluid in the compression chamber through the connection passage to the rebound chamber during a compression stroke of the piston rod and moves the fluid in the rebound chamber to the compression chamber during a rebound stroke of the piston rod.

Further, the second piston valve may be provided between a step portion of the upper housing and the lower housing to be restrained.

Further, the damping force variable shock absorber may further include a stop ring provided between the step portion and the second piston valve for restricting the range of movement of the plunger by serving as a stopper.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 1 is a front cross-sectional view of a damping force variable shock absorber according to a first embodiment of the present disclosure.

FIG. 2 is an enlarged view of a solenoid valve and a piston valve of the damping force variable shock absorber according to the first embodiment of the present disclosure.

FIG. 3 is a front cross-sectional view showing a stroke state in which a plunger is moved to a hard mode in the damping force variable shock absorber according to the first embodiment of the present disclosure.

FIG. 4 is a front cross-sectional view showing a stroke state in which the plunger is moved to a soft mode in the damping force variable shock absorber according to the first embodiment of the present disclosure.

FIG. 5 is a front cross-sectional view of a damping force variable shock absorber according to a second embodiment of the present disclosure.

FIG. 6 is an enlarged view of a solenoid valve and a piston valve of the damping force variable shock absorber according to the second embodiment of the present disclosure.

FIG. 7 is a front cross-sectional view showing a stroke state in which a plunger is moved to a hard mode in the damping force variable shock absorber according to the second embodiment of the present disclosure.

FIG. 8 is a front cross-sectional view showing a stroke state in which the plunger is moved to a soft mode in the damping force variable shock absorber according to the second embodiment of the present disclosure.

DETAILED DESCRIPTION

Hereinafter, embodiments of the present disclosure will be described in detail with reference to the accompanying drawings. The following embodiments are provided to sufficiently transfer the technical concepts of the disclosure to one of ordinary skill in the art. However, the disclosure is not limited to these embodiments, and may be embodied in another form. In the drawings, parts that are irrelevant to the descriptions may be not shown in order to clarify the disclosure, and also, for easy understanding, the widths, lengths, thicknesses, etc. of components are more or less exaggeratedly shown. Like numbers refer to like elements throughout this specification.

FIG. 1 is a front cross-sectional view of a damping force variable shock absorber according to a first embodiment of the present disclosure and FIG. 2 is an enlarged view of a solenoid valve 1200 and piston valves 1300 and 1400 of the damping force variable shock absorber according to the first embodiment of the present disclosure.

Referring to the drawings, the damping force variable shock absorber according to an embodiment of the present disclosure includes a cylinder 1010 having an inner tube 1011 and an outer tube 1012 filled with a fluid, a housing 1100 coupled to a lower end of a piston rod 1020 located inside of the inner tube 1011 and forming a connection passage 1101 therein, a magnet member 1210 provided inside the housing 1100, a plunger 1230 moved by magnetic force of the magnet member 1210 to open and close the connection passage 1101, and a first piston valve 1300 and a second piston valve 1400 which are coupled to the outside of the housing 1100 to divide a compression chamber 1011a from a rebound chamber 1011b.

The cylinder 1010 includes the inner tube 1011 forming an inner space and the outer tube 1012 provided outside the inner tube 1011. The inner tube 1011 may have a cylindrical shape forming a space therein, and the fluid (oil or the like) is filled in the inner tube 1011. The outer tube 1012 has a diameter larger than an outer diameter of the inner tube 1011 and the outer tube 1012 may have a shape corresponding to the inner tube 1011. The interior of the inner tube 1011 may be divided into the compression chamber 1011a and the rebound chamber 1011b by the first piston valve 1300 to be described later.

One end of the outer tube 1012 and one end of the piston rod 1020 may perform compression and rebound strokes while being connected to the vehicle body or the wheels side, respectively. In addition, a separate coupling portion (not shown) may be provided at the lower end of the outer tube 1012 for connecting to the vehicle body or the wheels side.

The piston rod 1020 has one end coupled to the housing 1100 and the other end extending to the outside of the outer tube 1012 to be connected to the vehicle body or the wheels side of the vehicle.

A storage chamber 1030 is formed between the outer tube 1012 and the inner tube 1011 to have a predetermined distance and the storage chamber 1030 is separated from the compression chamber 1011a by a body valve 1040. The fluid in the compression chamber 1011a may be moved to the storage chamber 1030 through a flow path of the body valve 1040 during the compression stroke of the piston rod 1020. Conversely, the fluid in the storage chamber 1030 may be moved to the compression chamber 1011a through the flow path of the body valve 1040 during the rebound stroke of the piston rod 1020.

The body valve 1040 is installed at the lower end of the compression chamber 1011a to separate the compression chamber 1011a from the storage chamber 1030. At this time, the fluid moves upward or downward through the flow path of the body valve 1040, and damping force is generated by a resistance force in the process of moving the fluid in the rebound and compression stroke directions.

Upper and lower portions of the body valve 1040 are provided with a disk for opening and closing a pressure passage in a selected direction. For example, when the piston rod 1020 is in the compression stroke (downward in the illustrated direction), the fluid moves through the flow path of the body valve 1040 to the storage chamber 1030. Conversely, when the piston rod 1020 is in the rebound stroke (upward in the illustrated direction), the fluid moves to a direction opposite to the above-described operation.

The housing 1100 includes an upper housing 1110 coupled to inside of the piston rod 1020 at an upper portion thereof and a lower housing 1120 coupled to a lower portion of the upper housing 1110 and having the first and second piston valves 1300 and 1400 to be installed.

The upper housing 1110 is made of a metallic iron material and connected to the piston rod 1020 by a rod fastener 1111 provided at the upper portion thereof. The upper housing 1110 is provided with a first housing hole 1110a along the outer peripheral surface thereof to communicate outer space and inner space. That is, the first housing hole 1110a horizontally connects the connection passage 1101 and the rebound chamber 1011b and moves the fluid in the rebound chamber 1011b to the inside of the connection passage 1101 by the opening operation of the plunger 1230.

The lower housing 1120 includes a disk-shaped fastening body 1121 which is press-fitted into the lower portion of the upper housing 1110, and a valve guide 1122 provided in the lower portion of the fastening body 1121 to be coupled to the first and second piston valves 1300 and 1400. The first and second piston valves 1300 and 1400 may be restrained up and down by the fastening body 1121 and a nut 1130.

The lower housing 1120 is coupled with the upper housing 1110 from the lower side of the solenoid valve 1200 to maintain the assembled state. The inner space of the lower housing 1120 is connected to the compression chamber 1011a through to a guide hole 1122a and a second housing hole 1122b.

The guide hole 1122a may be formed along a longitudinal direction of the valve guide 1122 so as to be perpendicular to the first housing hole 1110a. At this time, the guide hole 1122a may have a cross-sectional area larger than that of a main passage of the first piston valve 1300. The second housing hole 1122b may be formed to penetrate horizontally between the guide hole 1122a and the rebound chamber 1011b.

The connection passage 1101 may be formed in the housing 1100 so that at least a part of the fluid flowing toward the first piston valve 1300 by the opening and closing of the plunger 1230 may flow to the second piston valve 1400 side in a bypass manner. The connection passage 1101, when opened, may be provided to pass through the first housing hole 1110a provided in the upper housing 1110, a plunger hole 1231a provided in the plunger 1230, the guide hole 1122a provided in the lower housing 1120, and the second housing hole 1122b provided between the first piston valve 1300 and the second piston valve 1400. That is, the connection passage 1101 is provided to pass through the first housing hole 1110a provided on the outer circumferential surface of the housing 1100 near the plunger 1230 and the second housing hole 1122b provided between the first piston valve 1300 and the second piston valve 1400.

In a state of being coupled to the piston rod 1020 located inside the inner tube 1011, the solenoid valve 1200 moves the plunger 1230 to open and close the connection passage 1101. The solenoid valve 1200 includes the magnet member 1210 for generating a magnetic force by electric power fed from a wire 1211 serving as a power supply means, the plunger 1230 for vertically moving by the magnet member 1210, and an elastic member 1220 which is supported by the magnet member 1210 at one end and provides an elastic force to the plunger 1230 at the other end.

The magnet member 1210 converts the variable shock absorber into a soft mode or a hard mode by operating the plunger 1230 with a magnetic force generated by an external power source. That is, the plunger 1230 moves upward or downward according to the direction of the magnetic force formed in the solenoid valve 1200, so that the fluid is allowed to pass through both the first and second piston valves 1300 and 1400 or pass through only the second piston valve 1400, thereby converting the damping force.

The plunger 1230 closes the connection passage 1101 in the hard mode so that the fluid can pass through the first and second piston valves 1300 and 1400, and opens the connection passage 1101 in the soft mode so that the fluid can pass through the second piston valve 1400 via the connection passage 1101.

The plunger 1230 includes a disk-shaped plunger body 1231, the plunger hole 1231a formed in the plunger body 1231, a protrusion 1232 formed on the upper of the plunger body 1231 and restricting the horizontal movement of the elastic member 1220, and a blocking portion 1233 which protrudes downward from the edge of the plunger body 1231 and opens and closes the first housing hole 1110a of the housing 1100 by the vertical moving of the plunger body 1231.

The blocking portion 1233 closes the first housing hole 1110a when the plunger body 1231 moves upward and opens the first housing hole 1110a when the plunger body 1231 moves downward. Conversely, unlike as shown in drawing, the blocking portion 1233 can open the first housing hole 1110a when the plunger body 1231 moves upward and close the first housing hole 1110a when the plunger body 1231 moves downward, but is not limited thereto.

Meanwhile, the plunger hole 1231a is vertically penetrated to be positioned below the first housing hole 1110a when the plunger 1230 is lowered, and also may be penetrated to downward to be connected to the upper end of the guide hole 1122a.

A stop ring 1240 may be interposed between a step portion 1112 and the fastening body 1121. The stop ring 1240 restricts the range of movement of the plunger 1230 by serving as a stopper when the plunger 1230 moves downward.

The first piston valve 1300 divides the inside of the inner tube 1011 into the compression chamber 1011a and the rebound chamber 1011b. The first piston valve 1300 reciprocates within the inner tube 1011 and generates the damping force due to the resistance of the fluid. For example, when the first piston valve 1300 performs the compression stroke, the pressure of the lower compression chamber 1011a is higher than that of the upper rebound chamber 1011b. At this time, the fluid filled in the compression chamber 1011a moves to the rebound chamber 1011b while pushing up valve means through a first valve passage 1300a and in this process the damping force due to the resistance of the fluid is generated. Conversely, when the first piston valve 1300 performs the rebound stroke, it operates in a direction opposite to the process of above-described compression stroke.

A gap ring 1310 may be interposed between the inner tube 1011 and the first piston valve 1300 or between the inner tube 1011 and the second piston valve 1400. The gap ring 1310 is made of a plastic material and prevents damage or deformation caused by direct contact between the inner tube 1011 and the first and second piston valves 1300 and 1400, which are made of the metal material.

The second piston valve 1400 may generate the damping force through a second valve passage 1400a. The second piston valve 1400 may have the same structure as the first piston valve 1300. The second piston valve 1400 may be held between a spacer 1320 and the nut 1130 provided in the lower housing 1120. The spacer 1320 is provided to separate the gap between the first piston valve 1300 and the second piston valve 1400 so as to allow the fluid to flow into and out of the second housing hole 1122b.

The second piston valve 1400 allows the fluid to flow regardless of whether the connection passage 1101 is opened or closed. Specifically, the second piston valve 1400 allows the fluid in the compression chamber 1011a to move to the rebound chamber 1011b via the connection passage 1101 during the compression stroke of the piston rod 1020, and the fluid in the rebound chamber 1011b to move to the compression chamber 1011a during the rebound stroke of the piston rod 1020 via the connection passage 1101.

FIG. 3 is a front cross-sectional view showing a stroke state in which the plunger is moved to the hard mode in the damping force variable shock absorber according to the first embodiment of the present disclosure and FIG. 4 is a front cross-sectional view showing a stroke state in which the plunger is moved to the soft mode in the damping force variable shock absorber according to the first embodiment of the present disclosure. Hereinafter, operation of the damping force variable shock absorber will be described with reference to FIG. 3 or FIG. 4.

The fluid in the compression chamber 1011a moves to the rebound chamber 1011b through the first and second piston valves 1300 and 1400 during the compression stroke of the piston rod 1020 with the plunger 1230 raised by the solenoid valve 1200. At this time, the fluid fed to the rebound chamber 1011b through the first and second piston valves 1300 and 1400 passes through the two piston valves, thereby generating a hard damping force.

Conversely, the fluid in the rebound chamber 1011b moves to compression chamber 1011a through the first and second piston valves 1300 and 1400 during the rebound stroke of the piston rod 1020 with the plunger 1230 raised by the solenoid valve 1200, thereby generating the hard damping force.

On the other hand, the fluid in the compression chamber 1011a flows into the hole 1122b through the second valve passage 1400a of the second piston valve 1400 during the compression stroke of the piston rod 1020 in a state where the plunger 1230 is in the lowered position. At this time, the fluid fed to the connection passage 1101 through the guide hole 1122a moves to the rebound chamber 1011b through the plunger hole 1231a and the first housing hole 1110a, thereby generating a soft damping force.

Conversely, the fluid in the rebound chamber 1011b moves to the compression chamber 1011a through the connection passage 1101 and the second valve passage 1400a of the second fluid passage 1400a during the rebound stroke of the piston rod 1020 with the plunger 1230 lowered by the solenoid valve 1200, thereby generating the soft damping force.

Accordingly, in the damping force variable shock absorber according to the embodiment of the present disclosure, the first and second piston valves 1300 and 1400 are located outside the housing, the plunger 1230 is located inside the housing, and the plunger 1230 moves upward and downward according to the current input to the solenoid valve so as to open or close the first housing hole 1110a.

When the plunger 1230 moves upward to block the first housing hole 1110a, the fluid flows into the first and second piston valves 1300 and 1400 while causing the connection passage 1101 to be blocked, such that the hard damping force is generated. Conversely, when the plunger 1230 moves downward to open the first housing hole 1110a, the fluid flows into the connection passage 1101 and then flows through only the second piston valve 1400, such that the soft damping force is generated.

Accordingly, the two modes of the damping forces (soft damping force/hard damping force) can be formed, so that the ride comfort and the adjustment stability can be improved and the structure can be simple. In addition, since the first and second piston valves 1300 and 1400 are separately constructed, they can be independently tuned and be simultaneously controlled in both directions (rebound/ compression direction), thereby providing a high tuning freedom.

Hereinafter, a damping force variable shock absorber according to a second embodiment of the present disclosure will be described.

FIG. 5 is a front cross-sectional view of a damping force variable shock absorber according to a second embodiment of the present disclosure and FIG. 6 is a cross-sectional view illustrating a solenoid valve 2200 and piston valves 2300 and 2400 of the damping force variable shock absorber according to the second embodiment of the present disclosure.

Referring to the drawings, the damping force variable shock absorber according to an embodiment of the present disclosure includes a cylinder 2010 including an inner tube 2011 and an outer tube 2012 filled with a fluid, a housing 2100 coupled to a lower end of a piston rod 2020 located inside the inner tube 2011 and forming a connection passage 2101 therein, a first piston valve 2300 coupled to the outside of the housing 2100 and dividing a lower compression chamber 2011a and an upper rebound chamber 2011b, a magnet member 2210 provided inside the housing 2100, a second piston valve 2400 provided inside the housing 2100 and located below the magnet member 2210, and a plunger 2230 provided between the magnet member 2210 and the second piston valve 2400 and moved by magnetic force of the magnet member 2210 to open and close the connection passage 2101 shown in FIG. 8.

The cylinder 2010 includes the inner tube 2011 forming an inner space and the outer tube 2012 provided outside the inner tube 2011. The inner tube 2011 may have a cylindrical shape forming a space therein, and the fluid (oil or the like) is filled in the inner tube 2011. The outer tube 2012 has a diameter larger than an outer diameter of the inner tube 2011 and the outer tube 2012 may have a shape corresponding to the inner tube 2011. The interior of the inner tube 2011 may be divided into the compression chamber 2011a and the rebound chamber 2011b by the first piston valve 2300 to be described later.

One end of the outer tube 2012 and one end of the piston rod 2020 may perform compression and rebound strokes while being connected to the vehicle body or the wheels side, respectively. In addition, a separate coupling portion (not shown) may be provided at the lower end of the outer tube 2012 to be connected to the vehicle body or the wheels side.

The piston rod 2020 has one end coupled to the housing 2100 and the other end extending to the outside of the outer tube 2012 to be connected to the vehicle body or the wheels side of the vehicle.

A storage chamber 2030 is formed between the outer tube 2012 and the inner tube 2011 at a predetermined interval and the storage chamber 2030 is separated from the compression chamber 2011a by a body valve 2040. The fluid in the compression chamber 2011a may be moved to the storage chamber 2030 through a flow path of the body valve 2040 during a compression stroke of the piston rod 2020. Conversely, the fluid in the storage chamber 2030 may be moved to the compression chamber 2011a through the flow path of the body valve 2040 during a rebound stroke of the piston rod 2020.

The body valve 2040 is installed at the lower end of the compression chamber 2011a to separate the compression chamber 2011a from the storage chamber 2030. At this time, the fluid moves upward or downward through the flow path of the body valve 2040, and damping force is generated by a resistance force in the process of moving the fluid in the rebound and compression stroke directions.

Upper and lower portions of the body valve 2040 are provided with a disk for opening and closing a pressure passage in a selected direction. For example, when the piston rod 2020 and the first piston valve 2300 are in the compression stroke (downward in the illustrated direction), the fluid moves through the flow path of the body valve 2040 to the storage chamber 2030. Conversely, when the piston rod 2020 and the first piston valve 2300 are in the rebound stroke (upward in the illustrated direction), the fluid moves to in a direction opposite to the above-described operation.

The housing 2100 is made of a metallic iron material, and includes an upper housing 2110 coupled to the inside of the piston rod 2020 at an upper portion thereof and a lower housing 2110 coupled to a lower portion of the upper housing 2110 and to which the first piston valve 2300 is installed.

The upper housing 2110 is connected to the piston rod 2020 by a rod fastener 2111 provided at the upper portion thereof. The upper housing 2110 is provided with a housing hole 2110a along the outer peripheral surface thereof to communicate outer space and inner space. In detail, the housing hole 2110a horizontally connects the connection passage 2101 and the rebound chamber 2011b and moves the fluid in the rebound chamber 2011b to the connection passage 2101 by the opening operation of the plunger 2230.

The step portion 2112 restrains the second piston valve 2400 in the up and down direction together with a fastening body 2121 of the lower housing 2120. At this time, a stop ring 2240 may be interposed between the step portion 2112 and the second piston valve 2400. The stop ring 2240 restricts the range of movement of the plunger 2230 by serving as a stopper when the plunger 2230 moves downward.

The lower housing 2120 includes the disk-shaped fastening body 2121 which is press-fitted into the lower portion of the upper housing 2110, and a valve guide 2122 provided in the lower portion of the fastening body 2121 to be coupled to the first piston valve 2300. The first piston valve 2300 may be fixed up and down by the fastening body 2121 and a nut 2130 coupled to the lower side of the valve guide 2122.

The lower housing 2120 is coupled with the upper housing 2110 from the lower side of the solenoid valve 2200 to maintain the assembled state. The inner space of the lower housing 2120 is connected to the compression chamber 2011a through to a guide hole 2122a.

The guide hole 2122a may be formed along a longitudinal direction of the valve guide 2122 so as to be perpendicular to the housing hole 2110a. At this time, the guide hole 2122a may have a cross-sectional area larger than that of a first valve passage 2300a of the first piston valve 2300. Between the housing hole 2110a and the guide hole 2122a, a second valve passage 2400a for vertically moving the fluid in the rebound chamber 2011b to the compression chamber 2011a is formed.

Meanwhile, the connection passage 2101 is formed in the housing 2100 to communicate with the compression chamber 2011a and the rebound chamber 2011b each other through the second piston valve 2400. The connection passage 2101, when opened, may be provided to pass through the housing hole 2110a provided in the upper housing 2110, a plunger hole 2231a provided in the plunger 2230, the second valve passage 2400a provided in the second piston valve 2400, and the guide hole 2122a provided in the lower housing 2120.

In a state of being coupled to the piston rod 2020 located inside the inner tube 2011, the solenoid valve 2200 moves the plunger 2230 to open and close the connection passage 2101. The solenoid valve 2200 includes the magnet member 2210 for generating a magnetic force by electric power fed from a wire 2211 serving as a power supply means, the plunger 2230 for vertically moving by the magnet member 2210, and an elastic member 2220 which is supported by the magnet member 2210 at one end and provides an elastic force to the plunger 2230 at the other end.

The magnet member 2210 converts the variable shock absorber into a soft mode or a hard mode by operating the plunger 1230 with the magnetic force generated by an external power source. That is, the plunger 2230 moves upward or downward according to the direction of the magnetic force formed in the solenoid valve 2200, so that the fluid is allowed to pass through either the first piston valve 2300 or the second piston valve 2400, thereby converting the damping force.

The plunger 2230 closes the connection passage 2101 in the hard mode so that the fluid can pass through the first piston valve 2300, and opens the connection passage 2101 when the piston moves in the soft mode so that the fluid can pass through the second piston valve 2400.

The plunger 2230 includes a disk-shaped plunger body 2231, the plunger hole 2231a formed in the plunger body 2231, a protrusion 2232 formed on the upper of the plunger body 2231 and restricting the horizontal movement of the elastic member 2220, and a blocking portion 2233 which protrudes downward from the edge of the plunger body 2231 and opens and closes the housing hole 2110a of the housing 2100 by vertical moving of the plunger body 2231.

The blocking portion 2233 closes the housing hole 2110a when the plunger body 2231 moves upward and opens the housing hole 2110a when the plunger body 2231 moves downward. Conversely, unlike as shown in drawing, the blocking portion 2233 can open the housing hole 2110a when the plunger body 2231 moves upward and close the housing hole 2110a when the plunger body 2231 moves downward, but is not limited thereto.

Meanwhile, the plunger hole 2231a is vertically penetrated to be positioned below the housing hole 2110a when the plunger 2230 is lowered, and also may be penetrated downward to form a flow path with the second valve passage 2400a and the guide hole 2122a.

The first piston valve 2300 divides the inside of the inner tube 2011 into the compression chamber 2011a and the rebound chamber 2011b. The first piston valve 2300 reciprocates within the inner tube 2011 and generates the damping force due to the resistance of the fluid. For example, when the first piston valve 2300 performs the compression stroke, the pressure of the lower compression chamber 2011a is higher than that of the upper rebound chamber 2011b. At this time, the fluid filled in the compression chamber 2011a moves to the rebound chamber 2011b while pushing up the valve means through the first valve passage 2300a and in this process the damping force due to the resistance of the fluid is generated. Conversely, when the first piston valve 2300 performs the rebound stroke, it operates in a direction opposite to process of above-described compression stroke.

A gap ring 2310 may be interposed between the inner tube 2011 and the first piston valve 2300. The gap ring 2310 is made of a plastic material and prevents damage or deformation caused by direct contact between the inner tube 2011 and the first piston valve 2300, which are made of the metal material.

The second piston valve 2400 communicates with the compression chamber 2011a and the rebound chamber 2011b each other through the second valve passage 2400a. At this time, in a fluid movement between the compression chamber 2011a and the rebound chamber 2011b, the second piston valve 2400 may generate less flow resistance relative to the first piston valve 2300. The second piston valve 2400 may be provided between the step portion 2112 of the upper housing 2110 and the lower housing 2120 to be restrained. At this time, the stop ring 2240 may be interposed between the step portion 2112 and the second piston valve 2400.

The second piston valve 2400, in the state where the connection passage 2101 is opened, may move the fluid in the compression chamber 2011a through the connection passage 2101 to the rebound chamber 2011b during the compression stroke of the piston rod 2020 and move the fluid in the rebound chamber 2011b to the compression chamber 2011a during the rebound stroke of the piston rod 2020.

FIG. 7 is a front cross-sectional view showing a stroke state in which the plunger is moved to the hard mode in the damping force variable shock absorber according to the second embodiment of the present disclosure and FIG. 8 is a front cross-sectional view showing a stroke state in which the plunger is moved to the soft mode in the damping force variable shock absorber according to the second embodiment of the present disclosure. Hereinafter, the operation of the damping force variable shock absorber will be described with reference to FIG. 7 or FIG. 8.

The fluid in the compression chamber 2011a moves to the first valve passage 2300a of the first piston valve 2300, that is, to the rebound chamber 2011b through a main flow passage during the compression stroke of the piston rod 2020 with the plunger 2230 raised by the solenoid valve 2200. At this time, the fluid moving to the rebound chamber 2011b through the first piston valve 2300 generates a hard damping force.

Conversely, the fluid in the rebound chamber 2011b moves to compression chamber 2011a through the main passage of the first piston valve 2300 during the rebound stroke of the piston rod 2020 with the plunger 2230 raised by the solenoid valve 1200, thereby generating the hard damping force.

On the other hand, the fluid in the compression chamber 2011a flows into the guide hole 2122a during the compression stroke of the piston rod 2020 in a state where the plunger 2230 is in the lowered position. At this time, the fluid fed to the connection passage 2101 through the guide hole 2122a moves to the rebound chamber 2011b through the second valve passage 2400a of the second piston valve 2400 and the housing hole 2110a, thereby generating a soft damping force.

Conversely, the fluid in the rebound chamber 2011b moves to the compression chamber 2011a through the second valve passage 2400a of the second piston valve 2400 during the rebound stroke of the piston rod 2020 with the plunger 2230 lowered by the solenoid valve 2200, thereby generating the soft damping force.

Accordingly, in the damping force variable shock absorber according to the second embodiment of the present disclosure, the second piston valve 2400 (Soft Valve) is located inside the housing 2100, the first piston valve 2300 (Hard Valve) is located outside the housing 2100, and the plunger 2230 moves upward and downward according to the current input to the solenoid valve 2200 so as to open or close the housing hole 2110a.

When the plunger 2230 moves upward to block the housing hole 2110a, the fluid flows into only the first piston valve 1300 while causing the connection passage 2101 to be blocked, such that the hard damping force is generated. Conversely, when the plunger 2230 moves downward to open the housing hole 2110a, the fluid flows into the connection passage 2101 and then flows through the second piston valve 2400, such that the soft damping force is generated.

Accordingly, the two modes of the damping force (soft damping force/hard damping force) can be formed, so that ride comfort and steering stability can be improved and the structure can be simple. In addition, since the first and second piston valves 2300 and 2400 are separately constructed, they can be independently tuned and be simultaneously controlled in both directions (rebound/compression direction), thereby providing a high tuning freedom.

As is apparent from the above, the damping force variable shock absorber according to the present disclosure can selectively use the soft or hard damping force as needed by selecting the flow path through which the fluid passes by using the plunger which is moved in the soft or hard mode by the solenoid valve.

The damping force variable shock absorber according to the present disclosure can be built in the cylinder and a variable width of the plunger is not large. Therefore, the manufacturing cost can be reduced due to no bulky and complicated and design freedom can be secured.

The damping force variable shock absorber according to the present disclosure forms the two modes of the damping force (soft damping force/hard damping force), so that ride comfort and steering stability can be improved and the structure can be simple. Further, since first and second piston valves are separately constructed, a turning can be achieved independently and a high tuning freedom can be achieved due to simultaneously controlling in both directions (rebound/compression direction).

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A damping force variable shock absorber comprising:
    a cylinder;
    a housing coupled to a lower end of a piston rod and forming a connection passage therein;
    a magnet member provided inside the housing;
    a plunger moving by magnetic force of the magnet member;
    a first piston valve contacting an inner tube of the cylinder and coupled to an outside of the housing to divide a compression chamber from a rebound chamber; and
    a second piston valve coupled the housing,
    wherein the plunger includes:
    a disk-shaped plunger body disposed on an underside of the magnet member;
    a plunger hole formed in the plunger body;
    a protrusion formed on an upper portion of the plunger body; and
    a blocking portion protruding from a lower portion of the plunger body and configured to open or close the connection passage of the housing by a vertical moving of the plunger body, and
    wherein the connection passage is configured to be opened such that the at least a part of the fluid passes through a first housing hole opened by the plunger and a second housing hole provided between the first piston valve and the second piston valve, and when the plunger is moved to a hard mode the plunger closes the connection passage so that the fluid passes through the first and second piston valves, and when the plunger is moved in a soft mode the plunger opens the connection passage so that the fluid passes through the second piston valve through the connection passage.

2. The damping force variable shock absorber according to claim 1,
    wherein the cylinder having the inner tube and an outer tube filled with a fluid; and
    wherein the magnet member is configured to move the plunger away from the magnet member by the magnetic force to open the connection passage such that at least a part of the fluid flowing toward the first piston valve is bypassed to the second piston valve through the opened connection passage of the housing.

3. The damping force variable shock absorber according to claim 1,
    wherein the housing includes an upper housing coupled to an inner surface of the piston rod at an upper portion thereof and a lower housing coupled to a lower portion of the upper housing, the lower housing provided with the first and second piston valves.

4. The damping force variable shock absorber according to claim 3,
    wherein the lower housing includes a fastening body coupled to the upper housing and a valve guide provided with a guide hole and extending to a lower portion of the fastening body and fastening the first and second piston valves with a nut, and
    the first and second piston valves are restrained between the fastening body and the nut.

5. The damping force variable shock absorber according to claim 1, further comprising:
    an elastic member supported by the magnet member at one end and configured to press downward the plunger at the other end,
    wherein the protrusion configured to limit a horizontal movement of the elastic member.

6. The damping force variable shock absorber according to claim 1, further comprising:
    a stop ring provided between the plunger and the housing for restricting the range of movement of the plunger by serving as a stopper.

7. The damping force variable shock absorber according to claim 1,
    wherein the plunger hole is formed in a same direction as the vertical moving of the plunger body to be connected to an upper end of a guide hole formed at a lower portion of the housing.

8. The damping force variable shock absorber according to claim 1,
    wherein the connection passage, when opened in the soft mode, is provided to pass through the first housing hole, a plunger hole provided in the plunger, a guide hole provided in the lower housing, and the second housing hole.

9. The damping force variable shock absorber according to claim 1,
   wherein the second piston valve, in the state where the connection passage is opened, moves the fluid in the compression chamber through the connection passage to the rebound chamber during a compression stroke of the piston rod and moves the fluid in the rebound chamber through the connection passage to the compression chamber during a rebound stroke of the piston rod.

* * * * *